No. 729,920. PATENTED JUNE 2, 1903.
J. W. DE CASTRO.
PROCESS OF MAKING SUGAR.
APPLICATION FILED DEC. 1, 1902.
NO MODEL. 2 SHEETS—SHEET 1.

WITNESSES:
Wm. F. Doyle.

INVENTOR
Jacob William DeCastro,
by his attorney

No. 729,920. PATENTED JUNE 2, 1903.
J. W. DE CASTRO.
PROCESS OF MAKING SUGAR.
APPLICATION FILED DEC. 1, 1902.
NO MODEL. 2 SHEETS—SHEET 2.

WITNESSES: INVENTOR
Jacob William DeCastro,
by
his attorney

No. 729,920. Patented June 2, 1903.

UNITED STATES PATENT OFFICE.

JACOB WILLIAM DE CASTRO, OF NEW YORK, N. Y.

PROCESS OF MAKING SUGAR.

SPECIFICATION forming part of Letters Patent No. 729,920, dated June 2, 1903.

Application filed December 1, 1902. Serial No. 133,464. (No specimens.)

*To all whom it may concern:*

Be it known that I, JACOB WILLIAM DE CASTRO, a citizen of the United States, residing at New York, in the county of New York and State of New York, have invented certain new and useful Improvements in the Manufacture of Sugar; and I do hereby declare the following to be a full, clear, and exact description of the invention, such as will enable others skilled in the art to which it appertains to make and use the same.

The object of this invention is readily to purify saccharine liquids, such as cane, sorghum, and beet juices and saps and syrups.
At the defecation stage of sugar manufacture it is usual to treat the saccharine liquid with lime, and thereafter with carbonic acid, the resulting carbonate of lime formed in the liquid being a precipitate which carries down a part of the impurities of the liquid; but the procedure is crude, and the lime, with glucose or other substance present in the liquid, produces coloring-matter not thereafter carried down by the precipitate.
My invention consists in bringing the lime to the saccharine liquid in immediate presence of carbonic acid, whereby the carbonate is at once formed as the lime and the liquid come together, thus, among other advantages, either avoiding the production of coloring-matter or, if produced, trapping it and carrying it with impurities to the bottom.

The accompanying drawings will serve to illustrate one manner of forming a precipitate in liquid with lime and carbonic acid without necessity of the lime being first present in the liquid.

Figure 1:
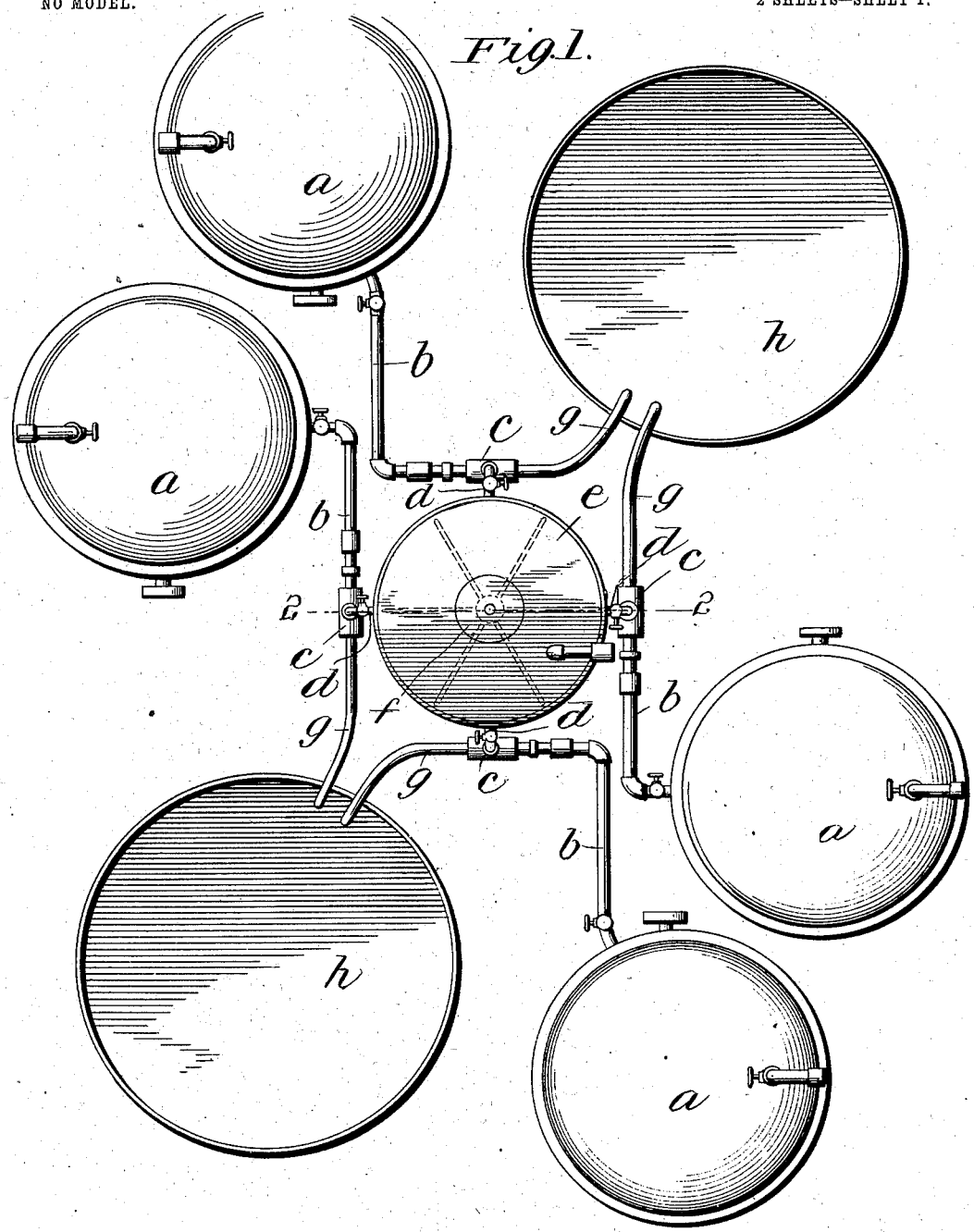
Figure 2:
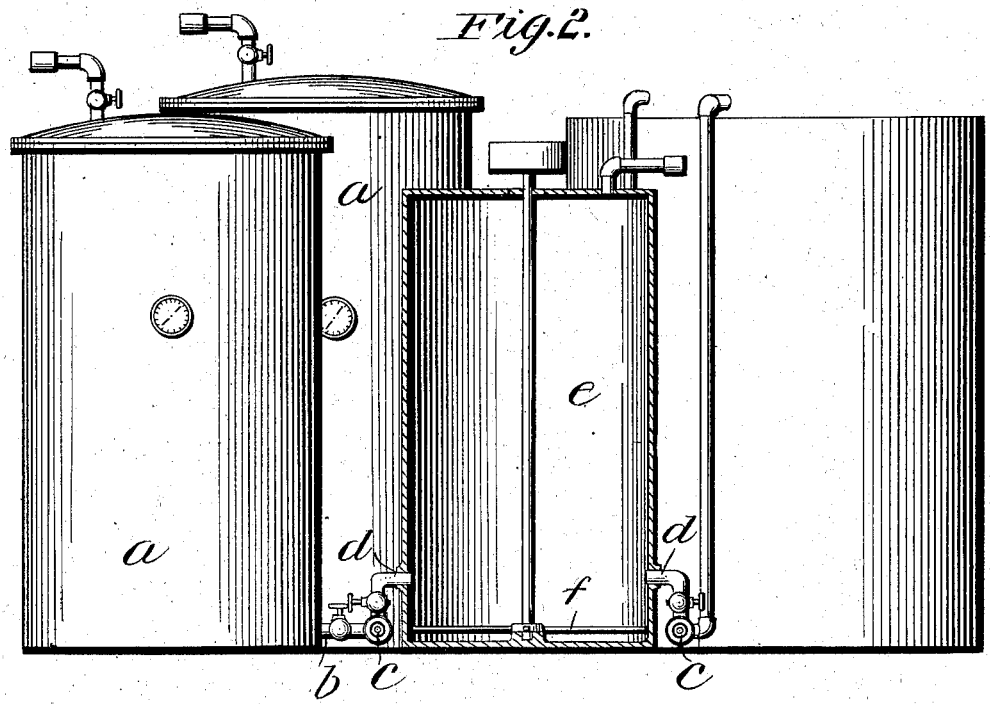
Figure 3:
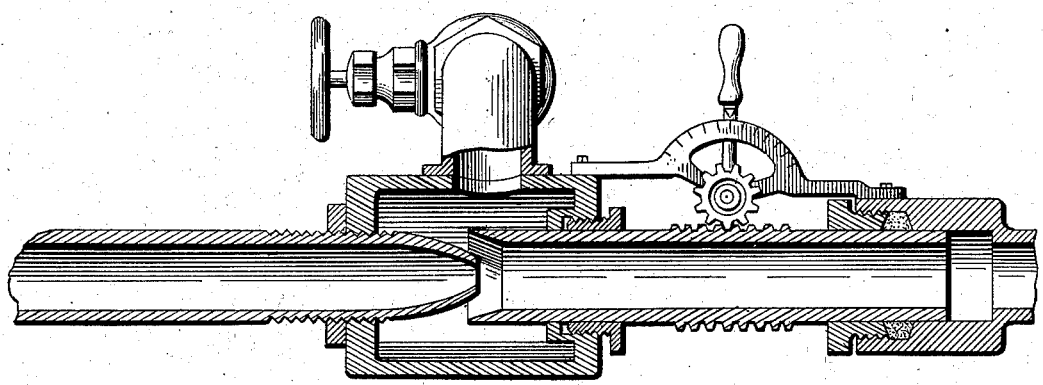

Figure 1 is a view in plan showing a convenient arrangement of vessels, injectors, pipes, and valves by which my invention may be carried into effect. Fig. 2 is a view in elevation of the same. Fig. 3 is a view in vertical section of a suitable injector apparatus.

Referring to the drawings, the desired liquid, not too dense to be properly fluent and to permit subsequent subsidence of the precipitate, preferably practically free from atmospheric air at any desirable temperature and under proper operative pressure of carbonic-acid gas, is in one or more vessels $a$, which may be kept suitably filled by the liquid, preferably under constant pressure. From $a$ the liquid passes by pipe or pipes $b$, suitably valved for control, to one or more ejectors $c$, one or more for each vessel $a$, to milk of lime, coming by valved pipe or pipes $d$ from a vessel or vessels $e$, provided, preferably, with stirring device $f$ and kept properly supplied with milk of lime or its equivalent.

Saccharine liquid being in a vessel $a$, such, with carbonic acid, meets the lime in the chamber of the ejector—desirable relative proportions of these substances being well known in the art and the proportions being regulated by adjustment of injector or valves as commonly understood—carbonate of lime is at once formed, which either prevents the action of the lime to produce coloring-matter in the liquid or traps this as soon as produced, as also some of the feculent impurities, and the saccharine liquid, with the carbonate of lime, then passes by pipe or pipes $g$ to vessel or vessels $h$, where it may be heated and any free carbonic acid be driven off by heat, or by establishment of a vacuum recovering the carbonic acid, or both, by heat and vacuum, as desired, or more lime may be added properly to meet excess of acid, and, on the liquid resting, the carbonate precipitates, carrying down the impurities.

It will be obvious that the saccharine liquid being presented to the lime it may meet the carbonic acid brought to it separately somewhat before or just as it meets the lime, or it may contain sufficient carbonic acid without being under pressure or force thereof, and that this would be within the spirit of my invention, which is, with facility of operation and effect, the formation of a clarifying-precipitate in a liquid throughout the same without rendering the liquid first alkaline; in saccharine liquids the avoidance of production of coloring-matter in the liquid by the lime, or the trapping of coloring-matter if produced by presenting carbonic acid to the lime at the moment the lime meets or is met by the saccharine liquid. By adding the carbonic acid to the juice practically first and then adding the lime the formation of the various organates of lime which darken the juice and interfere with crystallization is avoided. In the employment of carbonic acid the juice can be left quite acid without fear of subsequent inversion, as the carbonic acid may be driven off by boiling.

In bringing the saccharine liquid and the carbonic acid and the lime together under protection or masking of the liquid by the carbonic acid the desirable quantity of lime for the amount of and according to the kind of the liquid and the desirable quantity of carbonic acid to combine with the lime at the liquid may be regulated to avoid the adduction of too much lime or, if desired, any excess of carbonic acid which would cause solution of the carbonate.

It will be understood that after the subsidence the clear liquid is drawn off and may again be treated as above described and for alkalinity, and the precipitate and scum are sent to the filter, though all may be filtered together, and after filtration the liquid is evaporated to desired density, after which it may be subjected to another clarification, as above, and another filtration and to any requisite sulfitation for bleaching, thereafter going to the vacuum-pan and the centrifugal, as usual.

Where other substances—such as magnesia, strontian, saccharate of lime, &c.—are employed, the procedure will be substantially the same.

Having thus fully described my invention, what I claim, and desire to secure by Letters Patent, is—

1. The method of defecating a saccharine liquid, which consists in mingling the lime therewith while the liquid is protected by carbonic acid, substantially as set forth.

2. The method of defecating saccharine liquids, which consists in mixing the same with the lime, simultaneously with carbonic acid, substantially as described.

3. The method of defecating saccharine liquids, which consists in bringing the same, under pressure of carbonic-acid gas, to the lime, substantially as described.

In testimony whereof I affix my signature in the presence of two subscribing witnesses.

JACOB WILLIAM DE CASTRO.

Witnesses:
  E. P. POISSON,
  FRANK S. WILKINS.